Feb. 16, 1965 B. A. HOOK 3,169,563
APPARATUS FOR HEATING LOW PRESSURE STEAM
Filed July 11, 1963
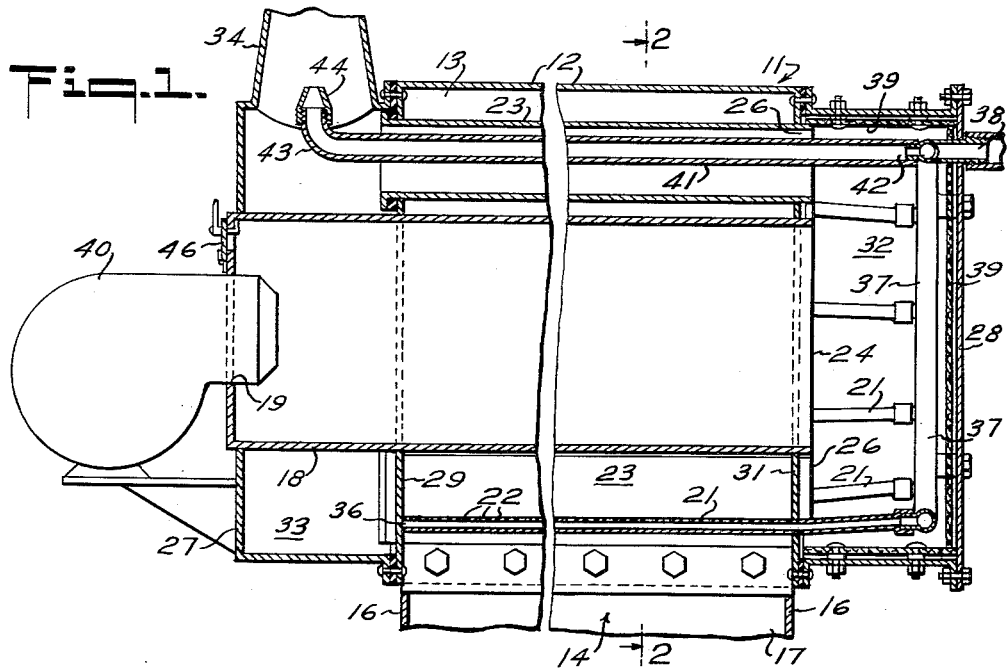
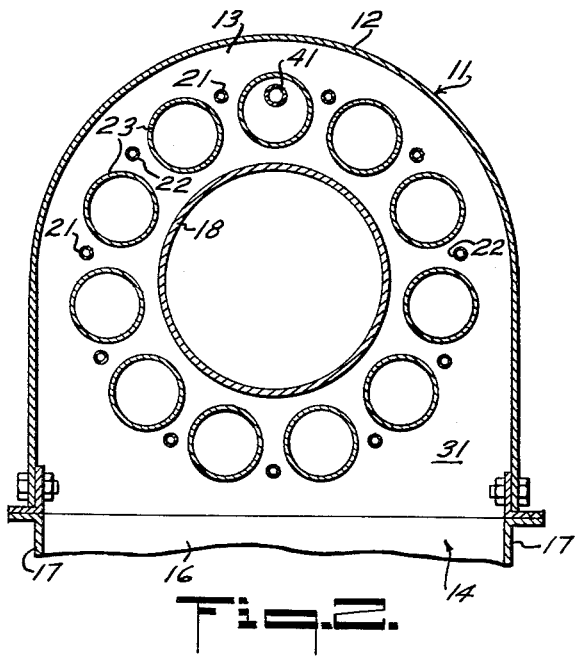
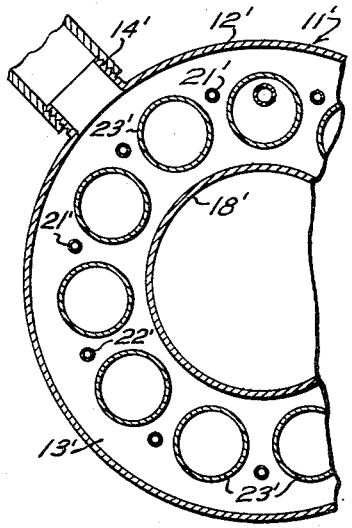
INVENTOR
BENTON A. HOOK
BY
ATTORNEYS

United States Patent Office 3,169,563
Patented Feb. 16, 1965

3,169,563
APPARATUS FOR HEATING LOW PRESSURE
STEAM
Benton A. Hook, 18 Otsego St., Oakley, Calif.
Filed July 11, 1963, Ser. No. 294,362
5 Claims. (Cl. 146—47)

This invention relates generally to apparatus used in treating fruit or vegetables to remove the outer skin thereof, and more particularly to apparatus for heating steam to high temperatures under suitable environmental conditions for use in the process of "slip-peeling" the fruit or vegetables.

A process now being used in the art of removing skin from fruits or similar articles involves subjecting the fruit to steam whereby the fruit's skin becomes blistered and separated from the subjacent flesh. In order to employ this process effectively, it is important to provide a very hot steam environment to which the fruit is exposed for a relatively short period of time. With relatively low steam temperatures it is necessary to keep the fruit exposed to the steam for correspondingly longer periods, and the desired blistering of the fruit's skin becomes less readily achieved. Furthermore, if the fruit is subjected to the steam for too long a time there occurs deep heat penetration into the fruit's flesh, and the consequent cooking of this flesh derogates the quality and grade of the fruit. Accordingly, the most effective slip peeling treatment is achieved by providing as hot as possible a steam environment in which the fruit need be exposed for only a very brief time, whereby the skin is separated from the flesh with no appreciable cooking thereof.

Factors other than the temperature of the steam itself must be considered in achieving optimum peeling conditions. As is understood in the art, the use of high pressure steam or superheated steam in close proximity to the fruit is undesirable. Excessive velocities and turbulence resulting from high pressure steam is capable of rupturing the skin of the fruit, or otherwise adversely affecting its quality. In addition, to obtain the benefit of high temperature of superheated steam, the steam must be released from a nozzle in close proximity to the fruit, which in turn can cause uneven heating of portions of the fruit's surface disposed at different distances from the nozzle. Thus some regions of the fruit may evidence scorching or deep heat penetration, while other regions may have insufficient blistering to separate the skin.

To achieve the advantages of slip peeling with the least extent of undesirable side effects, it has been found most suitable to provide an atmosphere of ambient steam vapor at raised temperatures, whereby the fruit can be exposed to uniform rapid heating without scorching or rupturing of the fruit. In achieving a uniformly heated steam environment suitable for slip peeling, the most difficulty has heretofore been encountered in providing suitably high ambient temperatures. It will be appreciated that saturated steam discharged into a chamber under atmospheric conditions will quickly drop in temperature to about 212° F. Steam at this temperature is not capable of adequately heating the fruit to effectuate the desired skin separation without cooking of the subjacent flesh.

Apparatus heretofore used in creating a high temperature ambient steam environment have been capable of providing steam temperatures up to a maximum of 300° F. While steam at such temperature has been found generally suitable for use in the slip peeling process, there is usually present some degree of cooking of the fruit's flesh, though with most fruits the heat penetration is within limits of tolerance and does not substantially deteriorate the fruit's quality. It has been felt, however, that ambient steam temperatures above 300° F. would even further improve the process of slip peeling, although heretofore it has not been possible to achieve such high temperatures.

Accordingly, an object of the present invention is to provide improved apparatus for heating steam under atmospheric conditions whereby fruit subjected to such steam has its skin separated by blistering in less time and with less cooking of the flesh subjacent the skin than has been heretofore possible.

Another object of the invention is to provide apparatus for readily heating steam within a chamber under generally atmospheric pressure conditions to temperatures of 400° F. for the process of slip peeling, and to temperatures as high as 700° F. for other purposes such as cooking and processing meats and fish.

A further object of the present invention is to provide apparatus of the character described for heating steam under generally atmospheric conditions to much higher temperatures than have been heretofore possible, yet while still affording all of the advantages of prior arrangements, including the control of the vapor content of the steam so as to vary its heat conductive characteristics, the provision of a uniformly heated environment, and the lack of high velocities or harsh turbulence of the steam.

FIGURE 1 is a fragmentary cross sectional side elevation view of a structure embodying the present invention.

FIGURE 2 is a cross sectional view taken along the plane of line 2—2 as shown in FIGURE 1.

FIGURE 3 is a view similar to FIGURE 2, but of a structure embodying a modified form of the invention.

Referring now to said drawings, there is shown an apparatus 11 for heating steam under generally atmospheric pressure conditions. In broad terms, the apparatus 11 includes a housing 12 enclosing a chamber 13 in which the steam is to be heated. The chamber 13 is generally elongated, although shown fragmentarily in FIGURE 1 for convenience of illustration, and can be adapted for disposition overlying the top of a conveyor belt (not shown) whereby steam from chamber 13 is placed into contact with articles such as fruit carried on the conveyor. In this regard, the housing 12 is shown in FIGURES 1 and 2 with an opening 14 along the bottom of chamber 13, so that a conveyor can be disposed longitudinally subjacent this opening. Walls 16, 17 can be provided to enclose the conveyor to contain the steam in proximate relation therewith, in a generally conventional manner. With regard to heating steam in the chamber 13, a first or inner heating tube 18 is disposed within the housing 12 and extends through the chamber 13. The tube 18 is adapted to receive heating fluids through the end 19 thereof, thus providing a source of heat within the chamber. At least one steam duct 21 is also disposed within the chamber 13 in spaced relation to the heating tube 18, and is provided with a plurality of spaced orifices 22 for directing steam from the duct 21 towards the tube 18. Consequently, steam flowing in the duct 21 is released therefrom through the orifices 22 into the chamber 13, with the spray of steam coming first into direct contact with the heating tube 18 to absorb heat therefrom by conduction.

In its preferred form, the apparatus 11 includes a plurality of elongated steam ducts 21 disposed circumferentially about and parallel with the heating tube 18, which also is preferably of generally elongated configuration. The steam ducts 21 are furthermore each seen to be radially spaced from the tube 18 with the orifices 22 positioned to direct the steam sprays from the ducts radially towards the tube 18. A plurality of outer heating tubes 23 are disposed in the chamber 13, in parallel spaced relation to the tube 18 and ducts 21, and disposed circumferentially around the tube 18 in generally adjacent interposition with the ducts 21. Means to be described more fully place the end 24 of the inner heating tube 18 in communication with the adjacent ends 26 of the outer tubes 23, whereby heating fluids, such as combustion gases, can flow though the tube 18 and then through the outer tubes 23, thus passing twice through the chamber 13.

Regarding now some details of construction of the apparatus 11, the housing 12 includes a pair of spaced end walls 27, 28 and a pair of spaced generally annular plates 29, 31 disposed transversely in the housing with each plate being respectively adjacent and longitudinally spaced from one of the end walls. The tube 18 extends through the openings in the annular plates in sealing relation therewith, with its end 24 terminating adjacent the plate 31 and its end 19 terminating adjacent the end wall 27 and communicating therethrough to the exterior of the housing. The housing and annular plates are thus seen to define two end regions 32 and 33 in said housing respectively adjacent the end walls 28 and 27, with the chamber 13 being defined as an annular region enclosed by the two annular plates, the inner heating tube, and the housing. The chamber 13 is blocked from communication with the end regions 32 and 33. The outer tubes 23 extend through the chamber 13 between the annular plates and communicate therethrough with the two end regions 32 and 33, whereby the region 32 serves to place the inner heating tube 18 in communication with the outer tubes as mentioned hereinabove. An opening in the housing 12, such as provided by the conduit 34, communicates with the region 33 whereby heating fluids can be exhausted from the housing after having passed through the inner and outer tubes 18 and 23. As regards the steam ducts 21, they are seen to extend through suitable openings in the plate 31 into both the chamber 13 and the region 32, with the end 36 of each duct 21 terminating against the plate 29 in secured closed relation therewith. The orifices 22 are spaced longitudinally along only that portion of each duct 21 disposed within the chamber 13. A circular header tube 37 is positioned transversely in the housing adjacent the wall 28 thereof, and placed in communication with each of the steam ducts 21. A conduit 38 passes through the wall 28 into communication with the header tube, to provide means for supplying steam into the ducts 21. An asbestos liner 39 preferably is disposed adjacent the walls of the housing surrounding the region 32, in order to insulate against loss of heat from this region.

As regards the source of heating fluid to be passed through the tubes 18 and 23, it is preferred that a source of combustion (not shown) such as an oil or gas burner be positioned adjacent the end 19 of tube 18. A blower 40 is provided to force oxygen or other gases into the tube 18 for combustion. The heated combustion gases then pass through the tube 18, the region 32, the outer tubes 23, and are exhausted through the region 33 and conduit 34. A relatively large steam duct 41 is disposed longitudinally through said housing with a portion thereof positioned inside one of the outer heating tubes 23. One end 42 of the duct 41 communicates with the header tube 37, and the other end 43 is disposed in the region 33 and provided with an ejector nozzle 44 aimed outwardly through the conduit 34. The draft caused by steam ejected from the nozzle 44 assists the flow of combustion gases being exhausted through the conduit 34. A hinged inspection port 46 is preferably provided adjacent the end 19 of the tube 18 for visual inspection of the combustion, and also to allow an intake draft of air if necessary to improve the combustion.

In operating the apparatus 11, low pressure steam is introduced into the header tube 37 by means of the conduit 38. The steam may be provided by a conventional steam boiler, with a reducing valve being used to drop from boiler pressure down to the range of 2–20 p.s.i. As understood in the art, variation of the steam pressure within the aforesaid range can be used effectively to control the vapor density of the steam, which can thus be varied selectively depending on the type of fruit to be skinned. Higher moisture content is desirable with thin skinned fruits, to protect against dehydration and/or scorching, while a drier steam is more suitable to penetrate thicker skinned fruits.

The combustion gases introduced into the heating tube 18 are capable of providing temperatures up to 700° F., with the heat thereby provided being transferred to the steam in the chamber 13 by means of radiation and by conduction to the steam sprayed into contact with the tube 18. It is important to note the interacion between the heat being provided in the tube 18 and the heat removed therefrom by conduction to the steam sprayed against the tube 18. More specifically, in the absence of any steam being introduced into the chamber 13, the heat supplied by the combustion gases would be great enough to overheat and deteriorate the entire structure. However, with the steam from the ducts 21 being sprayed directly on the tube 18, there is a large immediate heat transfer to the steam, which enables very hot combustion gases to exist in the tube 18 without adverse effects. Consequently, an extremely large amount of heat is transferred directly to the steam by conduction when the steam contacts the tube 18. To assure against failures arising from a drop in the steam line, it is preferable to utilize a thermostatic control that will shutoff the source of combustion gases when the temperature in the tube 18 rises beyond a predetermined point. Also, suitable thermostatic control means can be provided to maintain a predetermined temperature at the processing chamber where the steam is being used.

In addition to the heating of the steam upon contact with the tube 18, there is further heat transfer to the steam as a result of the steam jets being reflected from the tube 18 towards the tubes 23. A mild turbulence results, whereby the steam surrounds the outer tubes 23 to pick up additional heat. Additional heat transfer occurs also by means of radiation from the tubes 18 and 23. Moreover, the presence of portions of the ducts 21 in the region 32 results in a heat transfer to the steam prior to its release from the ducts 21 into the chamber 13. In some instances it may be preferable to dispose the header tube 37 and ducts 21 in the region 33 instead of the region 32, whereby residual heat can be extracted from the gases just prior to their exhaustion from the housing. Also, this eliminates a large temperature differential in the region 32, and enables a larger amount of heat to pass through the outer tubes 23.

The steam heated in the chamber 13 in the manner just described is directed through the opening 14 into contact with the fruit to be treated as it passes on a conveyor along the bottom of the apparatus 11. Further versatility in the present invention is illustrated by the apparatus 11' shown in FIGURE 3, wherein the primed numerals indicate members corresponding to those depicted in FIGURES 1 and 2 by unprimed numerals. The apparatus 11' is seen not to have an opening 14 extending along its underside, but rather a conduit 14' is provided in communication with the chamber 13' and serves as means for transferring the heated steam to a remote position for treatment of fruits.

Steam heated by apparatus in accord with the present invention can be brought to temperatures as high as 700° F., and accordingly enables a significant improvement in the process of slip peeling fruits and vegetables, as well as in various processes, for treatment and cooking of other foodstuffs. In addition, because of the markedly higher temperatures provided by the instant apparatus than heretofore possible, it is feasible as with the structure shown in FIGURE 3 to transport heated steam to remote locations. Any drop in temperature resulting from such transportation is more than made up for by the higher initial temperature provided in the heating chamber, so that the heated steam available at the remote locations is at least of comparable temperature to that provided by any prior apparatus.

It will be evident that the invention may be embodied in forms other than as described above and illustrated in the drawings. It is therefore to be understood that variations may be adopted within the scope of the invention as set forth in the following claims.

What is claimed is:

1. Apparatus for heating low pressure steam comprising, in combination, a housing enclosing a chamber, a first heating tube extending through said chamber and having two ends, a second heating tube extending through said chamber disposed in spaced relation with said first tube and having two ends, means placing one end of said first tube in communication with one end of said second tube, said first tube having its other end adapted to receive a supply of heating fluid, said second tube having its other end adapted to exhaust heating fluid that has passed through said first and second tubes, and a steam duct disposed in said chamber in spaced relation with said first and second tubes and positioned generally adjacent said second tube, said steam duct being adapted to receive a supply of low pressure steam and having a plurality of orifices longitudinally spaced therealong for releasing steam into said chamber, said orifices being positioned to direct steam from said steam duct towards said first tube.

2. Apparatus for heating low pressure steam comprising, in combination, a housing enclosing a chamber, a generally elongated inner heating tube extending through said chamber, a plurality of substantially coterminous generally elongated outer heating tubes disposed in said chamber in generally parallel and radially spaced relation to said inner tube, means placing one end of said inner tube in communication with each of the adjacent ends of said outer tubes, said inner tube having its remaining end adapted to receive a supply of heating fluid, said outer tubes having their remaining ends adapted to exhaust heating fluid that has passed through said inner and outer tubes, a plurality of generally elongated steam ducts disposed in said chamber in substantially parallel and spaced relation with said inner and outer tubes, and means for supplying low pressure steam into said steam conduits, said steam ducts having a plurality of longitudinally spaced orifices disposed therealong for releasing steam into said chamber and positioned to direct the steam radially towards said inner tube.

3. The combination of claim 2 wherein said steam ducts are each interposed respectively between two of said outer tubes.

4. Apparatus for heating low pressure steam comprising, in combination, a housing enclosing a chamber, a first heating tube extending through said chamber and adapted to receive a flow of heating fluid, a second heating tube disposed in said chamber in spaced relation to said first tube, means defining a region within said housing in communication with said heating tubes and blocked from communication with said chamber and adapted to have heating fluid from said first tube flow through said region into said second tube, said second tube adapted to exhaust heating fluids from said housing, a steam duct disposed within said housing and extending through said region and said chamber, said steam duct adapted to receive low pressure steam for flow therein first through said region and then through said chamber whereby steam in said duct is heated prior to entering said chamber by heating fluid in said region, said steam duct having a plurality of orifices spaced along the portion thereof disposed in said chamber and positioned to direct steam released from said duct towards said first tube, and means for placing said chamber in communication with articles to be treated by the steam heated in said chamber.

5. Apparatus for heating low pressure steam comprising, in combination, a generally elongated housing having two spaced end walls, a pair of spaced annular plates disposed transversely in said housing respectively in inwardly longitudinally spaced relation to said end walls, first ones of said end walls and plates defining a first end region of said housing therebetween, second ones of said end walls and plates defining a second end region of said housing therebetween, said plates having central openings therethrough, an elongated inner heating tube disposed longitudinally in said housing and extending through the central openings of said annular plates in sealing relation therewith, said inner tube having one end thereof extending through said first end region and through said first end wall exteriorly of said housing and having its other end disposed adjacent said second annular plate in communication with said second end region of said housing, said plates and housing defining an annular chamber disposed concentrically around said inner tube and blocked from communication with said end regions of said housing adjacent the end walls thereof, a plurality of elongated outer heating tubes disposed longitudinally through said chamber between said annular plates and communicating through said plates with said end regions of said housing, said outer tubes being spaced circumferentially around said inner tube in generally parallel and radially spaced relation thereto, means for supplying combustion gases at about 700° F. into said inner tube at said one end thereof, said housing having an opening communicating with said first end region thereof for exhausting gases that have passed through said inner and outer heating tubes, a circular header tube disposed transversely in said housing adjacent said second end wall thereof in longitudinally spaced and coaxial relation with said inner tube, a plurality of elongated steam ducts disposed longitudinally in said housing and extending through said second annular plate, said steam ducts each having one end thereof in communication with said header tube and the other end secured to the annular plate closest said first end wall in closed relation therewith, said steam ducts having the portions thereof between said annular plates disposed in generally parallel and radially spaced relation to said inner tube and each being generally interposed between two of said outer tubes, said portions of said steam ducts each having a plurality of orifices longitudinally spaced therealong for releasing steam into said chamber and positioned to direct the steam radially towards said inner tube, an ejector steam duct disposed inside one of said outer tubes having one end communicating with said header tube and having its other end disposed within said exhaust opening in said housing for aiding the flow of heating gases out of said housing, means for supplying low pressure steam into said header tube, and means for placing said chamber in communication with articles to be treated by the steam heated in said chamber.

References Cited by the Examiner
UNITED STATES PATENTS

| | | | |
|---|---|---|---|
| 1,461,213 | 7/23 | Dravo | 122—460 |
| 2,676,632 | 4/54 | Hook et al. | 146—47 |

J. SPENCER OVERHOLSER, *Primary Examiner.*